April 17, 1962  A. K. GILLETTE ETAL  3,029,786
AUTOMATIC SHUTOFF DEVICE FOR A MILKING APPARATUS
Filed Feb. 4, 1960  3 Sheets-Sheet 1

INVENTOR.
ALLEN K. GILLETTE
GLENN A. PATTERSON
BY
Attorneys

April 17, 1962 A. K. GILLETTE ETAL 3,029,786
AUTOMATIC SHUTOFF DEVICE FOR A MILKING APPARATUS
Filed Feb. 4, 1960 3 Sheets-Sheet 2

INVENTOR.
ALLEN K. GILLETTE
GLENN A. PATTERSON
BY
Andrus & Starke
Attorneys

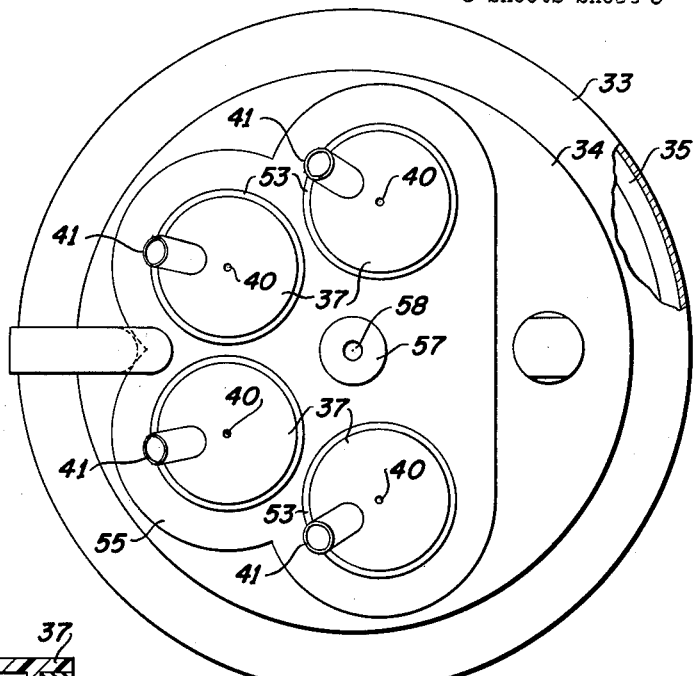
FIG. 7
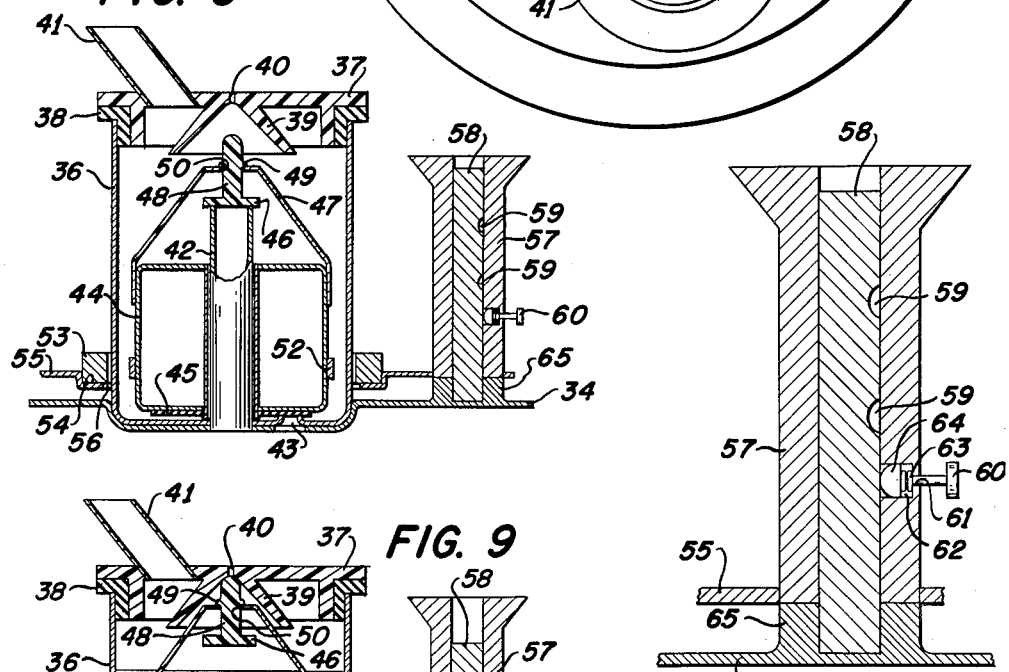
FIG. 8
FIG. 9
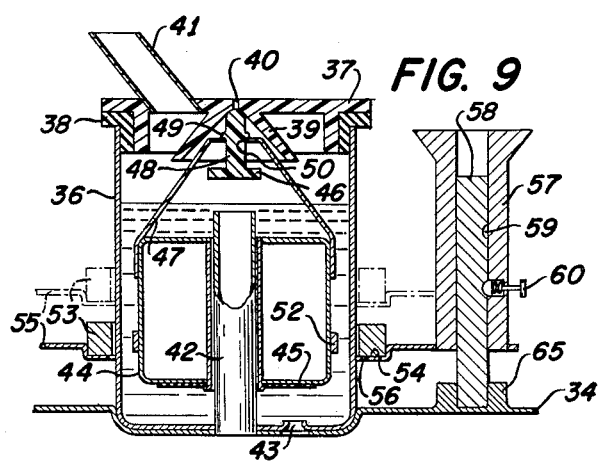
FIG. 10
INVENTOR.
ALLEN K. GILLETTE
GLENN A. PATTERSON
BY
Andrus + Starke
Attorneys

United States Patent Office

3,029,786
    Patented Apr. 17, 1962

3,029,786
    AUTOMATIC SHUTOFF DEVICE FOR A MILKING APPARATUS
    Allen K. Gillette, Belvidere, Ill., and Glenn A. Patterson, Delavan, Wis., assignors to Perfection Manufacturing Corporation, Capron, Ill., a corporation of Minnesota
    Filed Feb. 4, 1960, Ser. No. 6,710
    17 Claims. (Cl. 119—14.54)

This invention relates to an automatic shutoff device for a milking apparatus and more particularly to a device for breaking the vacuum applied to the animal's teats after flow of milk ceases.

An automatic shutoff device for a milker is employed to break the vacuum applied to the cow's teats after the flow of milk has ceased in order to prevent injury to the cow. The conventional shutoff device includes a bucket containing four cups or receptacles, each of which is connected to a teat cup. Each of the cups is provided with a milk outlet spaced above the bottom of the cup and which communicates with the bucket and each outlet is adapted to be closed off by a valve member carried by a float. Vacuum is applied through the bucket to each of the teat cups, and in order to initially establish the vacuum to the teat cups and start the flow of milk a lifting mechanism is employed to lift the valve member from the outlet tube. Once the milk is flowing into the cups, the floats will rise and engage the valves to thereby maintain the valves in the open position. When the flow of milk ceases, the floats will lower, thereby causing the valve members to close off the outlet tubes and break the vacuum to the teat cups.

The conventional automatic shutoff milker utilizes a complicated mechanical arrangement for initially lifting the valve members to establish vacuum to the teat cups. These devices usually require a substantial number of moving parts and are generally located within the bucket or milk zone and thus require cleaning after each milking operation. Because of the location and the number of components involved, it is often difficult to maintain the operating mechanism in the required degree of cleanliness.

The present invention is directed to an automatic shutoff device in which the valve members are initially opened to establish the vacuum to the teat cups by a mechanism located externally of the cups and bucket. More specifically, the valve member is connected to a magnetic susceptible material and a magnet is located outside of the cup or receptacle and serves to attract the magnetic susceptible member to thereby lift the valve member from the outlet tube to start the flow of milk.

The present invention provides a device in which the operating mechanism for initially lifting the valves from the outlet tubes is located wholly outside of the milk zone. This substantially simplifies the cleaning and also insures a more sanitary milking operation.

As the operating mechanism is located wholly on the outside of the bucket, no openings are required in the bucket or lid for the operating elements. By eliminating openings, the possibility of losing the vacuum through the openings is eliminated and the possibility of milk contamination by virtue of leakage through an imperfect seal is also eliminated.

The present invention reduces the number of moving parts in the operating mechanism and provides a device that is substantially cheaper and easier to produce.

Other objects and advantages will appear in the course of the following description.

The drawings illustrate the best mode presently contemplated of carrying out the invention.

In the drawings:

FIG. 7 is a top plan view of a modified form of the invention;

FIG. 8 is a vertical section of a cup of the modified form of the invention shown in FIG. 7;

FIG. 9 is a vertical section similar to FIG. 8 with the float in the upper position; and FIG. 10 is an enlarged vertical section of the post construction of the embodiment shown in FIG. 7.

FIGS. 1 through 6 illustrate an automatic shutoff device for a milking system which services to automatically break the vacuum to the teat cups after the flow of milk has ceased in order to prevent injury to the cow's teats.

The structure comprises a bucket 1 having an open top which is enclosed by a lid 2. The bucket may either be of the self-containing variety in which the milk from the cow is collected in the bucket itself or the bucket may be provided with an outlet through which the milk is conducted to a bulk storage location.

The lid 2 is provided with a downwardly extending peripheral flange 3 and a seal 4 is disposed between the lid and the upper edge of the bucket 1 to seal the joint therebetween. The bucket 1 is connected to a source of vacuum by a conduit, not shown, to provide an operating vacuum for the milker.

Figure 3:
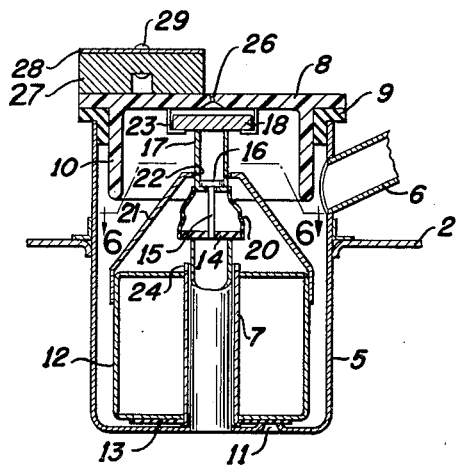
FIG. 3 is a vertical section taken through a cup member and showing the float and valve in the closed position before milk flows into the cup member.
Figure 4:
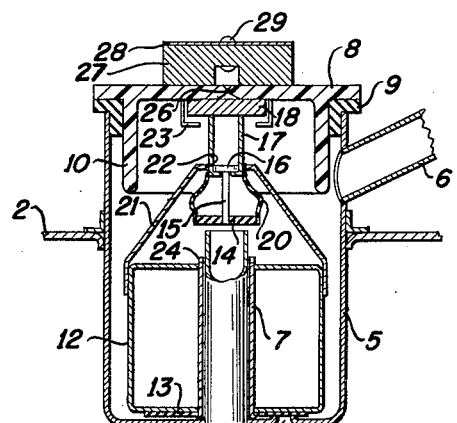
FIG. 4 is a view similar to FIG. 3 showing the position of the valve member after being lifted by the magnet and before the float is in engagement with the valve.
Figure 5:
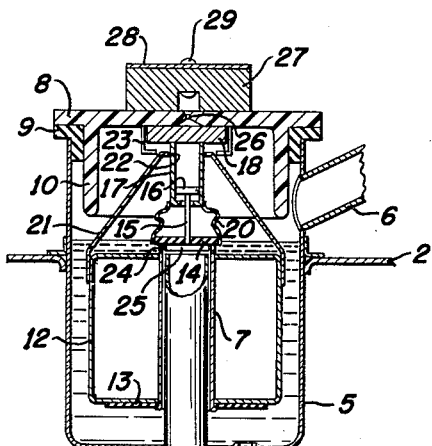
FIG. 5 is a view similar to FIG. 4 showing the member being substantially filled with milk and the float in contact with the valve.
Figure 6:
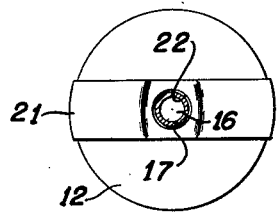
FIG. 6 is a top view of the float taken along line 6—6 of FIG. 3.

Four generally cylindrical cups 5 or receptacles are secured within openings in the lid 2 and each cup is provided with an inlet nipple 6 which is connected to a hose leading to a teat cup. As best shown in FIGS. 3 through 5, each of the cups 5 is provided with a central, vertical, outlet tube 7 into which the milk overflows and is discharged into the bucket 1.

The open top of each cup 5 is enclosed by a cover 8 which is generally made of transparent material and the cover 8 is sealed from the wall of the cup by an annular seal 9.

To deflect the milk entering the cup through the inlet nipple 6, the cover 8 is provided with a downwardly extending skirt 10 which intersects the axis of inlet nipple 6 and deflects the incoming milk downwardly along the walls of the cup.

Each of the cup 5 is also provided with a drain outlet 11 in the bottom wall of the cup through which the milk can drain into the bucket 1 at the completion of the milking operation.

A generally annular float 12 is slidably disposed about the central outlet tube 7 of each cup and the lower surface of the float carries an annular seal 13 which is adapted to close off the drain outlet 11 when the float is in its lowermost position.

The upper end of the outlet tube 7 is closed off by a valve 14 which is connected to the float 12. The valve 14 is provided with an upwardly extending stem 15 having an enlarged head 16 and the head is slidably disposed within a sleeve 17 carried by a magnetically susceptible member 18. To prevent contamination of the sliding surfaces of head 16 and sleeve 17, a flexible sealing member 20 is secured between the valve 14 and sleeve 17.

The sleeve 17 and member 18 are slidably supported by means of a strap 21 which is secured to the float 12. The strap is provided with an opening 22 which slidably receives the sleeve 17.

To restrict the downward movement of the sleeve 17 with respect to the strap 21 and maintain the magnetically susceptible member 18 in closely spaced relation with cover 8, a series of L-shaped fingers 23 are connected to the cover and the lower bent ends of the fingers are adapted to support the member 18.

The upper surface of float 12 is provided with a series of spaced upstanding projections 24 which are adapted to engage the valve 14 as the float rises and lift the valve upwardly. The spaces 25 between the projections 24 serve as passages for the flow of milk into the tube 7.

The cover 8 is provided with a central vent hole 26 which is adapted to be closed off by the member 18 when the member is lifted upwardly.

According to the invention, a series of magnets 27 are employed to attract the magnetically susceptible members 18 and lift the valves 14 from the upper ends of the outlet tubes to initially establish a vacuum through the cups 5 to the teat cups. The magnets 27 are adapted to rest on the covers 8 and each magnet is secured to a support plate 28 by a rivet 29.

To move the magnets 27 with respect to the cups 5, the support plate is secured to a central post 30 which is rotatably mounted within a well 31 secured within the lid 2. An operating lever 32 is connected to the post and by moving the operating lever, the magnets 27 can be rotated across the covers 8 to thereby move the magnets from an operative to a non-operative position.

Normally the magnetically susceptible member 18 is supported in closely spaced relation to the undersurface of the cover 8 by the fingers 23. When the magnet is moved to the operative position in axial alignment with the member 18, the member will be attracted to the magnet 27 and lifted upwardly into engagement with the cover. The valve 14, being connected to the member 18, will move a corresponding distance upwardly to thereby open the outlet opening and establish a vacuum through the cup to the animal's teat. To keep the size of the magnet within practical limits, the normal spacing between the member 18 and the undersurface of the cover 8 is minimized. With this minimum spacing, the valve 14 will only be lifted a small or minimum distance from the outlet, and thus the extensible or flexible connection is provided between the valve 14 and the member 18 so that the valve 14 can be moved further upward by the float to increase the size of the opening to the outlet tube. However under some circumstances it may be desirable to use a rigid or positive connection between the valve and the magnetically susceptible member.

Figure 1:
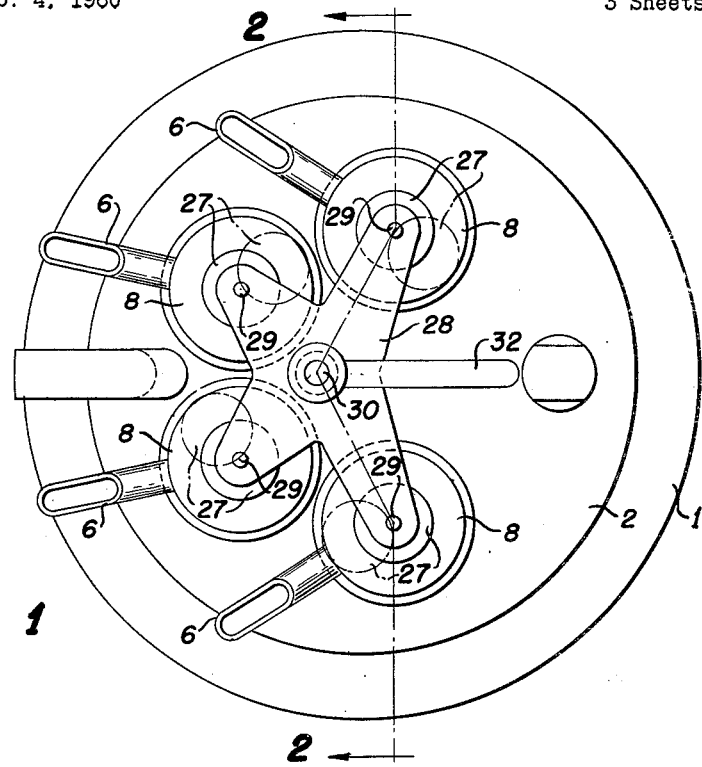
FIGURE 1 is a top plan view of the milk shutoff apparatus of the invention.
Figure 2:
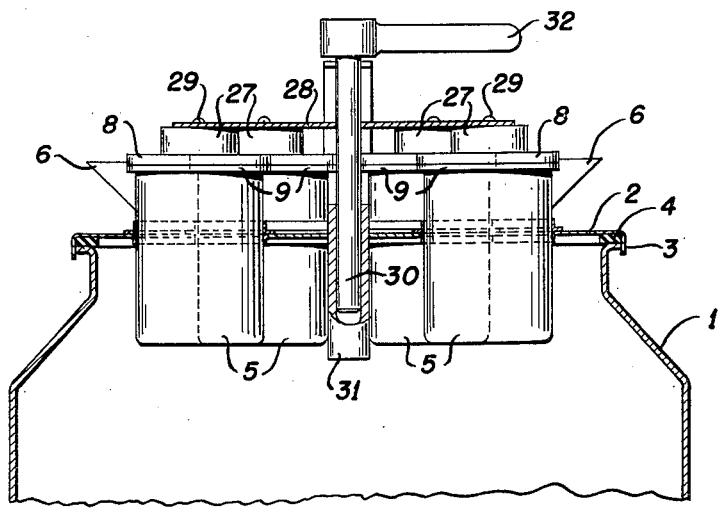
FIG. 2 is a vertical section taken along line 2—2 of FIGURE 1 with the cups and portion of the central post being shown in elevation.

In operation of the apparatus, the teat cups are initially applied to the cow's teats and a suitable vacuum line, not shown, is connected to the bucket 1 to draw a vacuum therein. The magnets 27, at this time, are located in the dashed position as shown in FIG. 1, out of axial alignment with the cups 5 so that the magnets will not attract the magnetically susceptible members 18. The valves 14 are in the lower position, closing off the outlet tubes 7.

To establish the vacuum from the bucket 1 to the teat cups, the magnets 27 are rotated by operating lever 32 to a position in axial alignment with the members 18. The members 18 are thereby drawn upwardly against the covers 8 to close off the vent holes 26. Upward movement of the member 18 draws the valve 14 upwardly, as shown in FIG. 3, to open the tube 7 and thereby establish a vacuum to the teat cup through the nipple 6. After the milk has begun to flow into the cup, the float 12 will rise until the projections 24 on the float engage the valve 14 and lift the valve to a higher level, as shown in FIG. 4. The milk within the cup will overflow through the passages 25 into the outlet tube 7 into the bucket 1.

At this time, the operator will return the magnets 27 to the dashed position, shown in FIG. 1, to thereby render the same inoperative with respect to the members 18.

After the milking operation has been completed and the milk ceases to flow, the milk within the cup will flow from the cup through the drain outlet 11 and the float 12 will thereby be lowered until the valve 14 seats on the outlet tube 7 to thereby cut off the vacuum through the cup 5 to the teat cups. With the vacuum removed, and atmospheric pressure restored through vent 26 the teat cups will then fall from the cow's teats or will be readily removed so that injury is prevented to the cow.

With the present invention, all of the operating mechanism for lifting the valve members from the tube 7 to initially establish the vacuum is contained on the outside of the cups and bucket in a location out of the milk zone. This substantially simplifies the cleaning operation and produces a more sanitary milk supply.

The operating mechanism of the invention substantially reduces the number of moving parts as compared with the conventional operating mechanism.

Furthermore, there are no openings required in the lid or the bucket for the entry of an operating mechanism and this not only simplifies the construction, but eliminates the requirement for a seal and insures the retention of the vacuum within the milk line.

FIGS. 7 through 10 illustrate a modified form of the invention including a bucket 33, similar to bucket 1 of the first embodiment, which is enclosed by a lid 34. A suitable annular seal 35 is disposed between the lid and bucket to seal the joint therebetween.

A plurality of receptacles or cups 36 are secured within suitable recesses in the lid 34 and project upwardly therefrom. Each of the cups 36 is provided with a cover 37 and an annular seal 38 is disposed between the cover and the cup 36 to seal the joint therebetween.

Each of the covers 37 is provided with a central, generally conical skirt 39 which projects downwardly within the interior of the cup 36. A vent hole 40, similar in function to vent 26 of the first embodiment, is provided in the cover 37.

Milk is introduced into each of the cups 36 through an inlet nipple 41 which is secured within an opening in the cover 37. The milk, entering the cup through the nipple 41, impinges against the skirt 39 and is deflected outwardly toward the wall of the cup.

Milk is discharged from the cups to the bucket 33 by a vertical outlet tube 42 which is disposed centrally within each of the cups 36. In addition, the cup is provided with a drain opening 43 similar in function to the drain opening 11 of the first embodiment.

A float 44 is disposed within each cup 36 and the lower surface of the float carries a seal 45 which closes off the drain outlet 43.

The outlet tube 42 is closed off by a resilient valve 46 which is supported by a strap 47 connected to the float 44. The valve member 46 is formed integrally with a stem 48 and an enlarged shoulder 49. The shoulder 49 is initially squeezed through the opening 50 in strap 47 and serves to prevent displacement of the valve 46 from the strap.

According to this embodiment, a band of magnetically susceptible material 52 is secured to the outer surface of the float 44. The float itself, as well as the cup, bucket, and other metallic components, is made out of non-magnetic material and the band 52 is attracted to an annular permanent magnet 53 which is slidably disposed on the outer surface of the cup 36.

The magnets 53 are supported in wells 54 formed in a plate 55, and each well has a central opening 56 to receive the respective cup 36.

To move the magnets 53 vertically with respect to the cup to thereby move the float 44 and unseat valve 46, a sleeve 57 is secured to the plate 55 and is slidably disposed on a central post 58 secured to the lid 34. The post 58 is provided with a series of notches 59 and a detent pin 60 is adapted to engage the notches to hold the plate 55 and the magnets 53 at a given vertical level.

The pin 60 extends through a suitable opening 61 in sleeve 57 and the opening is provided with an inner recess 62. A spring 63 is disposed within the recess 62 and urges the rounded tip 64 of the pin into the notch 59. By merely pulling upwardly on the sleeve 57, the rounded tip 64 of the detent pin will move out of the notch and the vertical level of the magnet 53 with respect to the cups can thus be changed.

In this embodiment, three vertical levels for the magnets 53 are provided. When the lower end of the sleeve 57 engages the boss 65 and post 58, each magnet, as shown in FIG. 9, will be located near the lower end of the cup in substantial horizontal alignment with the band of magnetically susceptible material 52. By moving the magnets upwardly so that the pin 60 engages the lowermost of the two notches 59, the float is correspondingly raised to lift the valve 46 from the outlet tube 42. After the flow of milk is established, the magnets 53 are raised to a higher level by engaging the pin 60 into the uppermost notch. The engagement of the upper end of the stem 48 of valve 46 with the cover 37 will prevent the float from following the magnet to the uppermost position. With the magnet 53 in the uppermost position, the strip 52 will be out of the influence of the magnet and enable the float to move downwardly to the bottom of the cup after the flow of milk ceases.

The operation of this embodiment is substantially similar to that of the first embodiment. To begin operation, the magnets 53 are located at their lowermost position with the sleeve 57 in engagement with the boss 65. To establish the vacuum within the cup 36, the magnets are raised upwardly to the first position in which the pin 60 engages the lowermost notch to thereby correspondingly raise the float 44 and lift the valve 46 from the outlet tube 42. This will establish the vacuum and cause the upper tip of the stem 48 of the valve to close off the vent hole 49 in the cover 37. When the milk flows within the cup 36, the float 44 will rise. At this time, the operator will move the magnet 53 to the second upper position by engaging the pin 60 into the uppermost notch 59 to thereby move the magnets to a location where they will not attract or influence the magnetically susceptible bands 52.

After the milk has ceased to flow, the remaining milk in the cup will flow from the cups through the outlet drain 43 and the float will lower to thereby seat the valve 46 on the outlet tube 42 and shut off the vacuum in cup 36.

In this embodiment, as in the case of the first embodiment, the operating mechanism for initially raising the valve members outside of the cups and the bucket is located out of contact with the milk. This simplifies the cleaning operation and provides a more sanitary milking operation.

Various embodiments of the invention are contemplated within the scope of the accompanying claims particularly pointing out and distinctly claiming the subject matter which is regarded as the invention.

We claim:

1. In a milking apparatus, means defining a chamber with said chamber having an inlet adapted to be connected to an animal's teat and having an outlet connected to a source of vacuum, float valve means disposed with the chamber for opening the outlet in the presence of milk and for closing the outlet in the absence of milk, said float valve means including a magnetically susceptible member, and a magnet located outside of the chamber and movable to an operative position, said magnet being magnetically coupled to said magnetically susceptible member when the magnet is in the operative position to thereby open said outlet and establish a vacuum through said chamber to the animal's teat and start the flow of milk.

2. In an automatic shutoff apparatus for a milking system, a closed cup having an inlet opening connected to an animal's teat and having an outlet opening spaced above the bottom of the cup and connected to a source of vacuum, a valve to open and close the outlet opening and movable in response to milk in said cup whereby the valve will open the outlet opening in the presence of a given quantity of milk in said cup and will close the outlet opening in the absence of said given quantity of milk, a magnetically susceptible member operably connected to the valve and movable with respect to the cup, and a magnet disposed on the outside of the cup and movable from an inoperative position to an operative position, said magnet being magnetically coupled to said magnetically susceptible member when in the operative position to thereby initially open the valve to establish a vacuum through the cup to the animal's teat and start the flow of milk.

3. In an automatic shutoff apparatus for a milking system, a closed cup having an inlet opening connected to an animal's teat and having an outlet opening spaced above the bottom of the cup and connected to a source of vacuum, a valve to open and close the outlet opening and movable in response to milk in said cup whereby the valve will open the outlet opening in the presence of a given quantity of milk and said cup and will close the outlet opening in the absence of said given quantity of milk, a magnetically susceptible member operably connected to the valve and movable with respect to the cup, a magnet disposed on the outside of the cup, and means for moving the magnet between a first position and a second position, said magnetically susceptible member being disposed in the magnet field of said magnet when the magnet is in said first position and being attracted to said magnet to thereby initially open the valve to establish a vacuum through the cup to the animal's teat and start the flow of milk and said magnetically susceptible member being outside of the magnetic field of the magnet when said magnet is in the second position.

4. In a milking apparatus, a bucket, a lid for the bucket, a plurality of containers secured to the lid with each container having an inlet opening connected to an animal's teat and having an outlet opening spaced above the bottom of the container and communicating through the bucket to a source of vacuum, a valve disposed within each container and operating to open and close the outlet opening, said valves being movable in response to milk in the respective containers whereby the valve will open the outlet opening in the presence of a given quantity of milk and will close the outlet in the absence of said given quantity of milk, a magnetically susceptible member operably connected to each of said valves, and a magnet associated with each container, said magnet being disposed on the outside of both the container and the bucket and movable from an inoperative position to an operative position, said magnetically susceptible member being disposed within the influence of said magnet when the magnet is in the operative position and being attracted to said magnet to thereby initially open the valve to establish a vacuum through the container to the animal's teat and start the flow of milk, and said magnetically susceptible member being outside of the influence of the magnet when the magnet is in the inoperative position.

5. In a milking apparatus, means defining a chamber with said chamber having an inlet adapted to be connected to an animal's teat, a tubular outlet disposed centrally of the chamber and connected to a source of vacuum, an annular float disposed around the tubular outlet in said chamber, a valve connected to the float and adapted to open and close the tubular outlet, a magnetically susceptible member operably connected to the valve, a magnet disposed on the outside of the chamber, means for moving the magnet between a first position and a second position, said magnetically susceptible member being disposed in the magnetic field of said magnet when the magnet is in said first position and being attracted to said magnet to thereby initially open the valve to establish a vacuum through the chamber to the animal's teats and start the flow of milk, and said magnetically susceptible member being outside of the magnetic field of the magnet when the magnet is in the second position, and means connected to the float and engageable with the valve for maintaining the valve in the open position when the magnet is moved to said second position.

6. In a milking apparatus, a cup having an inlet opening connected to an animal's teat, an outlet tube disposed centrally of the cup and having an outlet spaced above the bottom of the cup, a float disposed within the cup and movable in response to milk in said cup, a valve to open and close the outlet, a magnetically susceptible member disposed within the cup, means for flexibly connecting the valve and the magnetically susceptible member, a magnet located on the outside of the cup and magnetically coupled to said magnetically susceptible member to thereby initially open the valve to a first position to establish a vacuum through the cup to the animal's teat and start the flow of milk, and means connected to the float and engageable with the valve for further opening the valve to a second position as the float is raised within the cup by the milk being collected therein.

7. In a milking apparatus, a closed cup having an inlet opening connected to an animal's teat and having a vent opening exposed to the atmosphere, a central outlet tube disposed centrally of the cup and having an outlet spaced above the bottom of the cup and connected to a source of vacuum, a float disposed within the cup and movable in response to milk in said cup, a valve to open and close the outlet, a magnetically susceptible member disposed within the cup above said valve and in alignment with the vent opening, an extensible connection connecting the valve and said magnetically susceptible member, and a magnet disposed on the outside of the upper surface of the cup and movable from an inoperative position to an operative position, said magnetically susceptible member being disposed in the magnetic field of said magnet when said magnet is in said operative position and being attracted upwardly to said magnet to thereby close off the vent opening and initially lift the valve to establish a vacuum through the cup to the animal's teat and start the flow of milk, said magnetically susceptible member being located outside the magnetic field of magnet when said magnet is in the inoperative position, and means connected to the float and engageable with the valve for lifting the valve upwardly through said extensible connection to a higher level and provide an increased discharge of milk through the outlet.

8. The structure of claim 7, and including a seal disposed around the extensible connection to prevent the milk within the cup from contacting the connection.

9. The structure of claim 6, and including means connected to the float for slidably supporting the magnetically susceptible member.

10. In a milking apparatus, an open top cup having an inlet opening connected to an animal's teat, a cover for the cup, a tube disposed centrally of the cup and having an outlet spaced above the bottom of the cup and connected to a source of vacuum, an annular float disposed around the tube, a valve operably connected to the float and adapted to open and close the outlet, a magnetically susceptible member disposed in axial alignment with the tube and connected to the valve, said magnetically susceptible member normally located in closely spaced relation to the undersurface of the cover and said valve normally seating on said outlet to close off the same, and a magnet disposed adjacent the outer surface of the cover and movable parallel to the plane of the cover from an inoperative position to an operative position in alignment with said magnetically susceptible member to thereby attract said member upwardly and lift said valve from the outlet to establish a vacuum through the cup to the animal's teat and start the flow of milk.

11. In a milking apparatus, a bucket, a lid for the bucket, a plurality of cups secured to the lid with each cup having an inlet opening connected to an animal's teat and having an outlet opening communicating through the bucket with a source of vacuum, a valve to open and close each outlet opening and removable in response to milk in the respective cup whereby the valve will open the outlet opening in the presence of a given quantity of milk in said cup and will close the outlet opening in the absence of said given quantity of milk, a magnetically susceptible member operably connected to each valve and movable with respect to the corresponding cup, and a magnet disposed adjacent the outer surface of each cup, means connecting the magnets together, and operating means connected to said last named means for simultaneously moving all of said magnets between a first and a second position, each of said magnetically susceptible members being disposed in the magnetic field of the respective magnet when the magnet is in said first position and being attracted to said magnet to thereby initially open the valve to establish vacuum through the cup to the animal's teat and start the flow of milk, and said magnetically susceptible member being outside of the magnetic field of the respective magnet when said magnet is in the second position.

12. In a milking apparatus, a container having an inlet opening connected to an animal's teats and having an outlet opening spaced above the bottom of the container and connected to a source of vacuum, float valve means disposed within the container and including a float and a valve to open and close the outlet opening, said float being movable in response to milk in said container to cause the valve to open the outlet opening in the presence of a given quantity of milk and to close the outlet opening in the absence of said given quantity of milk, a magnetically susceptible member connected to the float, and a magnet disposed adjacent the peripheral surface of the container and movable from an inoperative position to an operative position, said magnet attracting said magnetically susceptible material when in the operative position to thereby initially open the valve to establish a vacuum through the cup to the animal's teat and start the flow of milk.

13. The structure of claim 12, in which the magnetically susceptible member is in the form of an annular band disposed on the outer surface of the float and the magnet has an annular shape and is slidably disposed with respect to the container.

14. In a milking apparatus, a bucket, a lid for the bucket, a plurality of cups secured to the lid with each cup having an inlet opening connected to an animal's teats and having an outlet opening connected to a source of vacuum, a cover for each cup, a float disposed within each cup and movable in response to milk in said cup, a valve operably connected to each float and adapted to open and close the outlet opening, a magnetically susceptible member secured to the outer surface of each float, and a magnet disposed adjacent the outer surface of the cup and located outside of the bucket and being movable from an inoperative position to an operative position, each of said magnets attracting the corresponding magnetically susceptible member when in the operative position to thereby initially open the valve to establish a vacuum through the cup to the animal's teat and start the flow of milk.

15. The structure of claim 14 and including means for connecting the magnets together whereby the magnets will be moved simultaneously from the operative to the inoperative position.

16. In a milking apparatus, a container having an inlet opening connected to an animal's teats and having an outlet opening spaced above the bottom of the container and connected to a source of vacuum, float valve means disposed within the container and including a float and a valve to open and close the outlet opening, said float being movable in response to milk in said container to cause the valve to open the outlet opening in the presence of a given quantity of milk and to close the outlet opening in the absence of said given quantity of milk, a magnetically susceptible member connected to the float, a magnet disposed adjacent the peripheral surface of the container, and means for moving the magnet between a first, a second and a third vertical position, said first position being in horizontal alignment with the magnetically susceptible member when the float is in the lowermost position, said second position being disposed above said first position and said magnetically susceptible band being attracted to the magnet when said magnet is in said second position and said float is in the lowermost position to thereby initially open the valve to establish a vacuum through the cup to the animal's teat and start the flow of milk, said third position being at a substantially higher vertical level than said second position and said magnetically susceptible member being outside of the magnetic field of the magnet when said magnet is in the third position and said float is in the uppermost position whereby said float and said magnetically susceptible member will be free to move downwardly within the cup at the completion of the milking operation.

17. The structure of claim 16, and including means for preventing the magnetically susceptible member and float from following the magnet when the magnet is moved upwardly from the second to the third position.

References Cited in the file of this patent

UNITED STATES PATENTS

| | | |
|---|---|---|
| 2,648,157 | Wilson et al. | Aug. 11, 1953 |
| 2,765,802 | Rowell | Aug. 9, 1956 |
| 2,887,986 | Golemon | May 26, 1959 |

FOREIGN PATENTS

| | | |
|---|---|---|
| 1,069,922 | Germany | Nov. 26, 1959 |

UNITED STATES PATENT OFFICE
CERTIFICATE OF CORRECTION

Patent No. 3,029,786                  April 17, 1962

Allen K. Gillette et al.

It is hereby certified that error appears in the above numbered patent requiring correction and that the said Letters Patent should read as corrected below.

Column 2, line 4, after "and" insert -- a --; line 26, for "services" read -- serves --; line 57, for "cup" read -- cups --; column 3, line 73, after "cup" insert -- 5 --; column 4, lines 50 and 51, for "withing" read -- within --; column 5, line 68, for "with" read -- within --.

Signed and sealed this 31st day of July 1962.

(SEAL)
Attest:

RNEST W. SWIDER
Attesting Officer

DAVID L. LADD
Commissioner of Patents